United States Patent [19]

Breedis et al.

[11] Patent Number: 5,472,796
[45] Date of Patent: Dec. 5, 1995

[54] COPPER ALLOY CLAD FOR COINAGE

[75] Inventors: John F. Breedis, Trumbull; Derek E. Tyler, Cheshire, both of Conn.

[73] Assignee: Olin Corporation, New Haven, Conn.

[21] Appl. No.: 372,272

[22] Filed: Jan. 13, 1995

[51] Int. Cl.[6] ..................................... B32B 15/20
[52] U.S. Cl. ........................... 428/679; 428/675; 40/27.5
[58] Field of Search ................................... 428/579, 674, 428/675, 672, 670, 671; 40/27.5

[56] References Cited

U.S. PATENT DOCUMENTS

| | | | |
|---|---|---|---|
| 3,381,364 | 5/1968 | Winter | 428/674 |
| 3,516,804 | 6/1970 | Trapp et al. | 428/579 |
| 3,634,890 | 1/1972 | Conradt et al. | 29/199 |
| 3,721,535 | 3/1973 | Pryor et al. | 29/199 |
| 4,292,377 | 9/1981 | Petersen et al. | 428/675 |
| 4,330,599 | 5/1982 | Winter et al. | 428/675 |
| 4,361,218 | 11/1982 | Van Dort | 194/102 |
| 4,398,626 | 8/1983 | Barnes | 194/100 |
| 4,401,488 | 8/1983 | Prinz et al. | 148/435 |
| 4,429,022 | 1/1984 | Breedis et al. | 428/675 |
| 4,436,790 | 3/1984 | Prinz et al. | 428/675 |
| 4,505,060 | 3/1985 | Bell et al. | 40/27.5 |
| 4,644,674 | 2/1987 | Burrows et al. | 40/27.5 |
| 5,094,922 | 3/1992 | Ielpo et al. | 428/579 |

OTHER PUBLICATIONS

"Steel–Rolling Technology—Theory and Practice" by Vladimir B. Ginzburg. Marcel Dekker, Inc. (1989) "Principles of Microscopic Plasticity" at pp. 199–208. No Month.

*Primary Examiner*—John Zimmerman
*Attorney, Agent, or Firm*—Gregory S. Rosenblatt

[57] ABSTRACT

There is provided a metallic composite useful for coinage. The core is formed from a copper alloy that contains between 50% and 99.0% copper, has a room temperature electrical conductivity in excess of 25% IACS an initial yield strength in excess of 10,000 psi and a dynamic softening response onset at a temperature in the range of 200° C.–400° C. The cladding layers have an initial yield strength more than that of the core and a gold color. The strengthening response of the core during cladding is similar to that of the cladding layers making the metallic composites resistant to corrugation. Reducing corrugation increases the sensitivity of electromagnetic coin discriminators.

22 Claims, 4 Drawing Sheets

COPPER ALLOY CLAD FOR COINAGE

BACKGROUND OF THE INVENTION

1. Field of the Invention

This invention relates to a metallic clad for coinage. More particularly, a planchet is formed by cladding a gold colored copper alloy to both sides of a copper alloy core that has a work hardening response and a dynamic softening response similar to that of the cladding layers.

2. Description of the Prior Art

A gold colored coin is highly desirable for distinguishing the coin from other denomination coins. The cost of the metal used for the coin should be low relative to the face value of the coin to enhance seigniorage. There are presently no gold colored metals or alloys that, in coins, satisfy the combination of requirements: (1) low cost, (2) appropriate density, (3) tarnish resistance, and (4) a unique, reproducible electromagnetic signature in coin acceptors for security against counterfeiting.

Cladding a gold colored metal to a low cost core solves the cost problem. Clad coinage also offers the potential of greater security against counterfeiting through a unique electromagnetic response, especially when the conductivity of the core and the cladding layers are significantly different. However, manufacturing a clad metal composite with the desired properties that are consistent and reproducible has proven to be difficult with many desirable clad and core combinations.

One coinage clad is disclosed in U.S. Pat. No. 4,330,599 to Winter et al that is incorporated by reference in its entirety herein. The Winter et al patent discloses a three layer clad with a hard copper alloy core having a yield strength above 51,000 psi. One disclosed core material is work hardened copper alloy C110 (nominal composition, by weight, 99.90% copper minimum and 0.05% oxygen maximum). Clad to this core is a gold colored alloy containing, by weight, 2%–3.5% aluminum, 1%–2.5% silicon and the balance copper. The cladding layers have a yield strength of less than 15,000 psi and are bonded to both sides of the core by cold rolling with a one pass reduction of 50%–75%.

Throughout this application, all alloy compositions are recited in weight percent unless otherwise noted.

Another gold colored coin clad is disclosed in U.S. Pat. No. 4,429,022 by Breedis et al, that is also incorporated by reference in its entirety herein. The Breedis et al patent discloses a core formed from copper alloy C151 (nominal composition by weight 0.05%–0.5% zirconium and the balance copper). The cladding layers are formed from a gold colored alloy containing: copper, 2%–3.5% by weight aluminum and 1%–2.5% by weight silicon. Bonding is achieved by a single pass reduction of 50%–75% followed by heating to a temperature of from 200° C.–750° C. for 5 minutes–24 hours.

The above clads provide a low cost gold color coin, but when the bonding reduction during cladding approaches 70%, the prior art clads are prone to corrugation. Corrugation is periodic ripples formed in the clad transverse to the rolling direction. Corrugation becomes worse as the composite becomes thicker and the problems with current cladding combinations are exacerbated as planchet thickness is increased from the present 0.65 mm to an anticipated 3 mm.

Corrugation is highly detrimental to automated identification of coins such as in a vending machine. As disclosed in U.S. Pat. No. 4,361,218 to Van Dort that is incorporated by reference in its entirety herein, one device to discriminate coins of different denominations emits an oscillating magnetic field. When a coin passes through this oscillating magnetic field, there is an electric signal phase shift in detecting coils that is dependent on the coin composition and coin diameter. This phase shift is electronically compared to the phase shift caused by a control coin.

Variations in the thickness of the clad layers will change the phase shift giving a different electromagnetic signature and require the acceptance parameters of the coin testing apparatus to be broadened to accept the variation between same denomination coins. Broadening the acceptance window compromises the discriminating capacity of the coin accepting device, making counterfeiting of the coins easier.

To minimize mistaking a coin from another one of a different denomination or nationality and to make counterfeiting more difficult, a gold colored coinage clad that is not prone to corrugation is needed to narrow the acceptance window of automatic coin discriminators.

SUMMARY OF THE INVENTION

Accordingly, it is object of the invention to provide a combination of copper alloys that have a gold colored clad, an appropriate density and consistently reproduced electromagnetic signature for coinage through minimizing the clad thickness variability. It is a feature of the invention that the core of the clad composite is formed from a copper alloy having a dynamic softening resistance similar to that of the cladding layers to minimize strength differences between the core and the cladding layers under the temperature rise that naturally occurs during the roll bonding process step. Another feature of the invention is that the external cladding layers are formed from a copper alloy having a gold color. Still another feature of the invention is that the cladding layers are joined to the core by cold rolling to a thickness reduction, in a single pass, of an excess of about 65%.

It is an advantage of the invention that the clad alloys of the invention resist corrugation and coins formed from this clad have an electromagnetic signature that is readily discerned by automated coin testing apparatus. Another advantage is that both the core and the cladding layers are gold colored and an edge profile of the coin does not present a laminar appearance.

In accordance with the invention, there is provided a metallic composite useful as a coinage material. This metallic composite has a core formed from a copper alloy that contains in excess of 50% by weight copper and less than 99.0% by weight copper. The core has a room temperature electrical conductivity in excess of about 25% IACS, an initial, before cladding, yield strength that is in excess of 10,000 psi and a dynamic softening resistance onset at a temperature of from about 200° C. to about 400° C.

Cladding layers are metallurgically bonded to both sides of the core. These cladding layers have both an initial yield strength more than that of the core and also a gold color.

The above stated objects, features and advantages will become more apparent from the specification and drawings that follow.

Preferably, the aluminum content is from about 4% to about 8%.

Among the preferred clad layer compositions are a copper alloy containing 20%–30% zinc, 2%–10% nickel and the balance copper with the nominal composition 24.5% zinc, 5.5% nickel and the balance copper.

Other suitable alloys include a copper base alloy containing 3%–10% aluminum, 2%–20% zinc and 0.5%–5% tin with the balance copper. A nominal composition for this alloy is 5% aluminum, 5% zinc, 1% tin and the balance copper.

Still another suitable alloy contains 2%–12% aluminum and 1%–5% nickel with the balance copper. This alloy has the nominal composition 6% aluminum, 2% nickel and the balance copper.

The thickness of the core and of the cladding layers are usually presented as a ratio of the percentage of the composite and ranges from about 10/80/10 (clad/core/clad thickness) to about 30/40/30. Preferably, the thickness ratio is from about 15/70/15 to about 27/46/27 and most preferably, the thickness ratio is about 25/50/25.

Thicker cladding layers are preferred because the signal generated by the electromagnetic detector is more secure. The oscillating magnetic field does not penetrate to the core layer where the electromagnetic response could be varied. Additionally, the cladding layers are more valuable than the core when composite scrap is melted, due to the alloying constituents present.

While preferably, the thickness of the two cladding layers are equal, this is not a necessary limitation.

Figure 1:
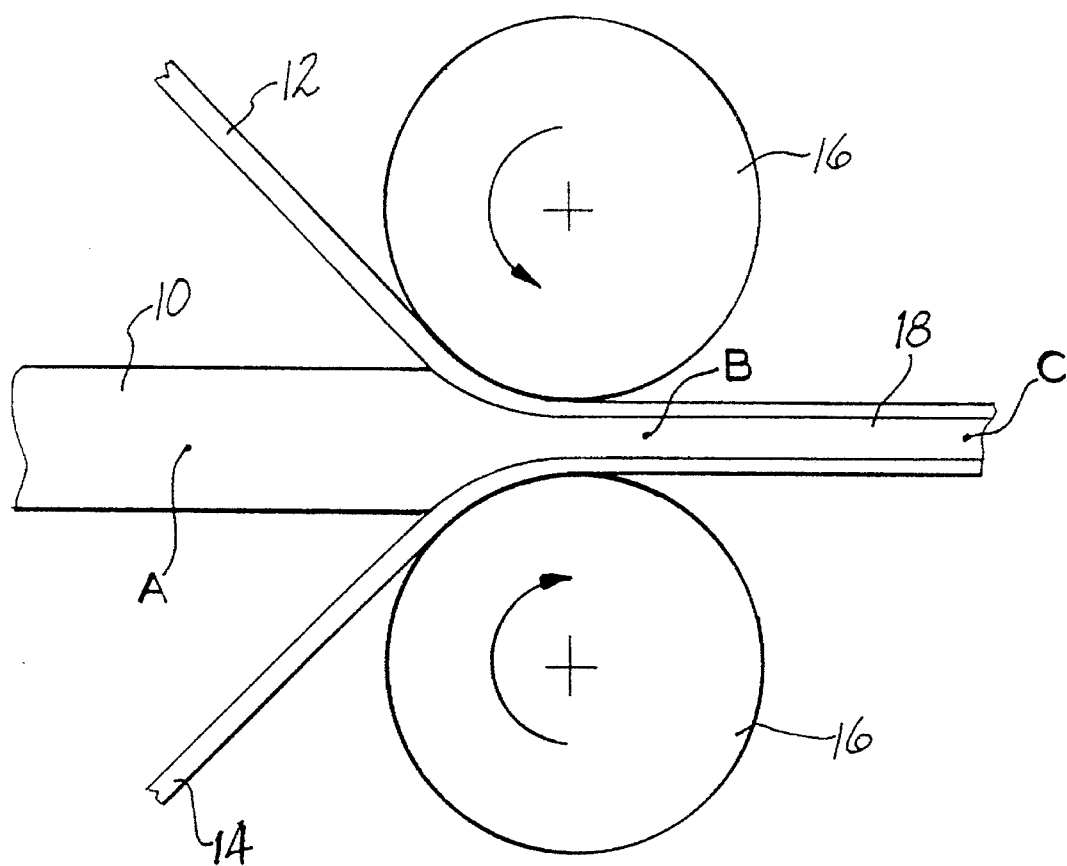
FIG. 1 shows in cross-sectional representation a method to form the composite of the invention.

Referring to FIG. 1, the core 10, a first cladding layer 12 and a second cladding layer 14 are soften in the temperature range of from about 300° C. to about 350° C. Unlike C151, the alloys of the invention have a cold rolling strengthening response similar to that of the cladding layers.

Preferred alloys for the core include copper-zinc alloys (brass) designated by the Copper Development Associated as CDA 200 series alloys and generally contain from about 95% copper for copper alloy C210 (94%–96% copper and the balance zinc) to about 70% copper for copper alloy C260 (68.5%–71.5% copper and the balance zinc).

As the zinc content increases, the electrical conductivity decreases, ranging from approximately 40% IACS for copper alloy C210 to 28% IACS for copper alloy C260.

Another group of preferred copper alloys are designated by the CDA as 500 series alloys, phosphor bronzes generally containing from about 0.75% to about 5% tin, optionally from about 0.01% to about 0.4% phosphorous and the balance copper. Representative of these alloys is copper alloy C505 having the composition, 1.0%–1.7% tin, 0.03%–0.35% phosphorous and the balance copper with an electrical conductivity of about 48% IACS.

The preferred copper alloys for the core have a gold color so that, in combination with the gold colored cladding layers, the coin presents a monochromatic, rather than laminar, edge profile.

The cladding layers are formed from any gold color metal or metal alloy that has an initial yield strength, before cladding, at 0.2% offset that is more than that of the yield strength of the core. Preferably, the cladding layers are formed from a copper base alloy containing more than 50% copper.

Preferred alloys for the cladding layers contain from about 3% to about 10% aluminum.

DETAILED DESCRIPTION

The composite alloys of the invention have a core formed from a gold colored copper alloy containing in excess of 50% by weight copper, but less than 99% by weight copper. The core has a room temperature electrical conductivity in excess of 25% IACS and preferably in excess of 35% IACS. IACS stands for International Annealed Copper Standard and assigns a value of 100% to annealed "pure" copper. Most preferably, the room temperature electrical conductivity of the alloy core is from about 40% IACS to about 90% IACS.

The higher the electrical conductivity of the core, the more easily coins formed from the clad composite are electronically distinguished from counterfeit coins or slugs. When the core is formed from an alloy containing less than about 90% copper, depending of the alloy additions, it is difficult to obtain and maintain an electrical conductivity in excess of 25% IACS. When the copper content exceeds about 99.0%, the alloy typically has strengthening during rolling and dynamic softening resistance characteristics more similar to that of copper than to that of the cladding alloys. Unless the strengthening during roll bonding and the dynamic softening resistance characteristics of the core are similar to that of the cladding layers, corrugation is likely.

In contrast to the high copper content alloys, such as C110 and C151, the copper alloys used as the core in the present invention have strengthening and annealing characteristics more similar to the copper alloy cladding layers than to unalloyed copper. Unlike C110, the alloys of the invention resist annealing at temperatures up to about 250° C. and metallurgically bonded together by the pressure and motion applied by rolls 16 of a rolling mill. The thickness of the metallic composite 18 that exits the rolls 16 is less than half the thickness of the core 10, the first cladding layer 12 and the second cladding layer 14, combined, prior to roll bonding. Preferably, the thickness reduction is from about 60% to about 90% and most preferably from about 65% to about 75%. A high bonding reduction is required to insure that a strong composite is obtained that will resist delamination during coin manufacture, such as during blanking of planchets.

To maintain the strength of the core, the rolls 16 are not significantly externally heated, although the rolls do heat as a result of redundant, irreversible work of rolling during the cladding operation. The rolls 16 should be at a temperature of 200° C. or less. Preferably, the rolls 16 are at room temperature (20° C.) or chilled to below room temperature.

Elevated temperature during roll bonding is avoided to prevent a loss of strength of the core 10. While the core 10 has a yield strength of at least 10,000 psi before entering the rolls, selection of the wrong copper alloy, such as a CDA 100 series copper alloy, leads to deleterious softening of the core during cladding and corrugation.

Cladding has two opposing influences on the strength of the core 10 and the first and second cladding layers 12, 14.

Figure 2:
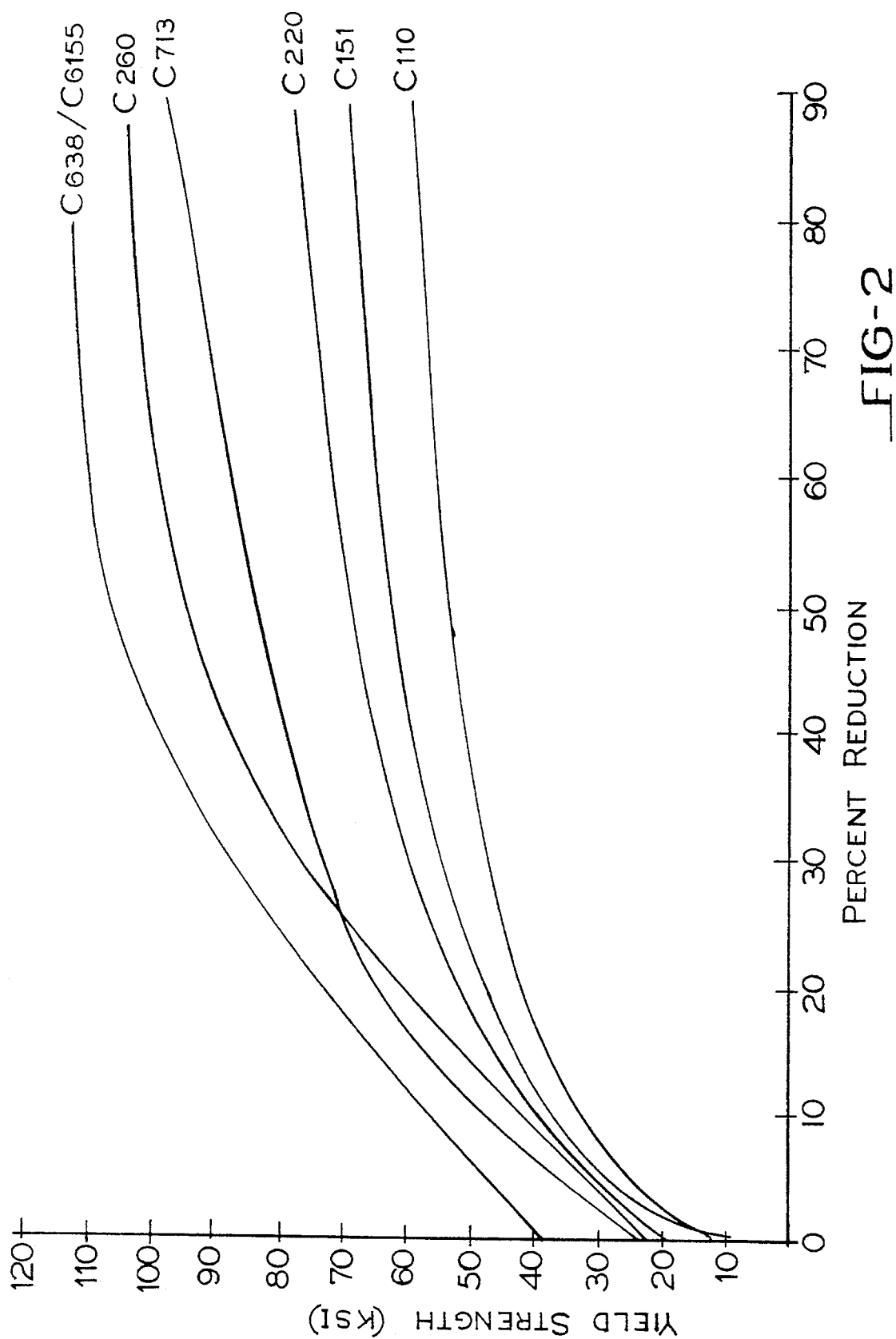
FIG. 2 graphically illustrates the change in yield strength of selected copper alloys as a function of the rolling reduction.

The disruption of the metal during cladding causes work hardening. The yield strength increases as a function of the percent of reduction. FIG. 2 graphically illustrates that the yield strength increase is most significant for cladding layer alloys such as copper alloy C638 (2.5%–3.1% aluminum, 1.5%–2.1% silicon, 0.25%–0.55% cobalt and the balance copper), C713 (23.5%–26.5% nickel and the balance copper) and C6155 (6% Al, 2% Ni and the balance copper). The yield strength increase is least significant for dilute copper alloys such as C110 and C151.

Suitable alloys for the core, represented in FIG. 2 by copper alloys C220 and C260, have a yield strength increase more similar to that of the cladding layers than to that of the dilute copper alloys.

Figure 3:
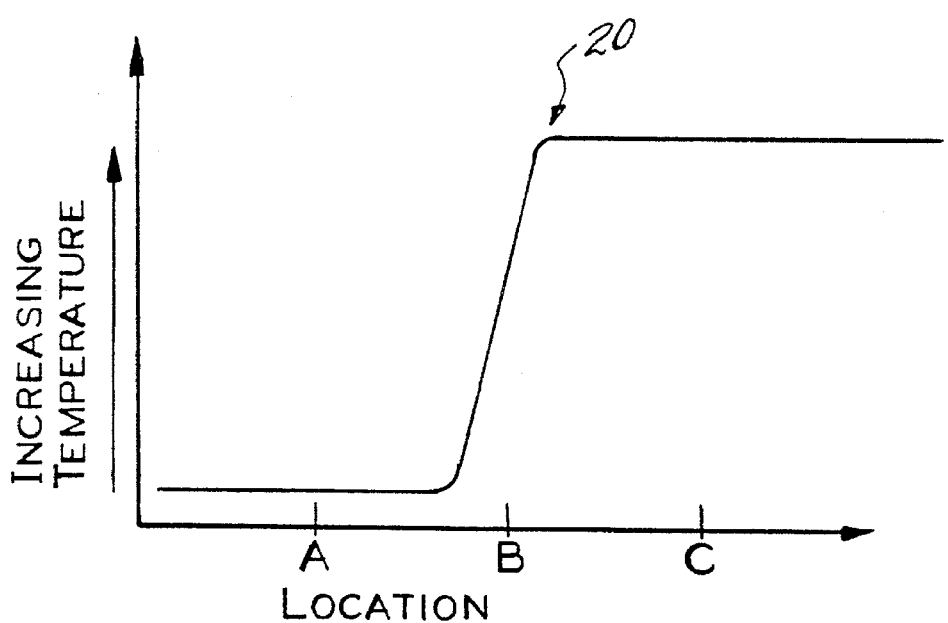
FIG. 3 graphically illustrates the change in temperature of the core during cladding.

Countering this work hardening effect, is a dynamic softening response due to internally generated heating of the metallic layers during cladding. FIG. 3 graphically illustrates the roll bonding increase of temperature. Referring to both FIGS. 1 and 3, at location A, prior to cladding, the core 10 is at room temperature. Immediately on exiting the rolls 16, the temperature rises to a peak temperature 20, typically from about 200° C. to about 400° C. and more typically, from about 250° C. to about 350° C.

Figure 4:
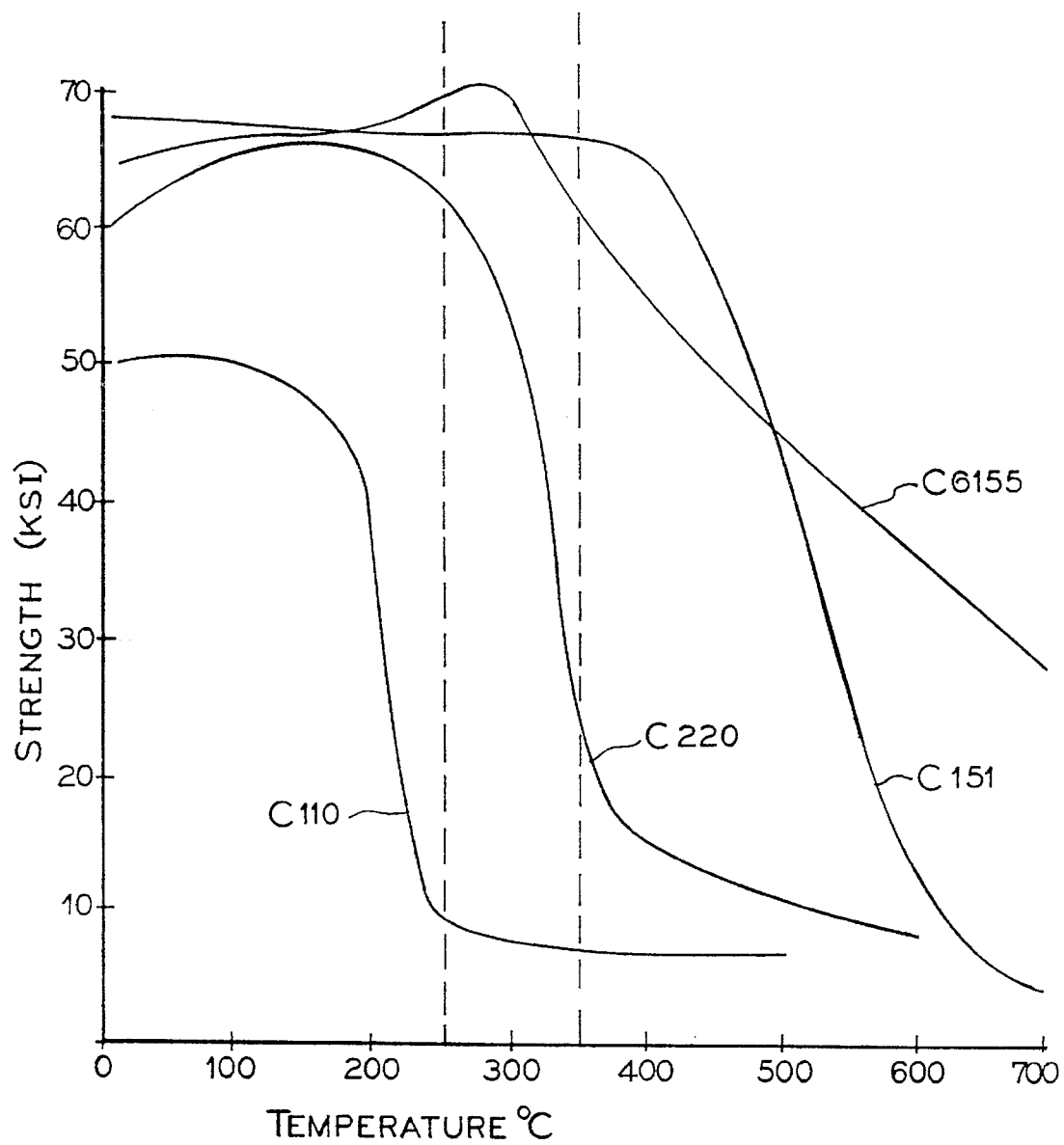
FIG. 4 graphically illustrates the change in yield strength of selected cold worked, by rolling, copper alloys as a function of temperature exposure after rolling.

With reference to FIG. 4, copper alloy C110 undergoes a rapid decrease in yield strength when the peak temperature exceeds 150° C. The yield strength of copper alloy C151 does not change significantly at temperatures of up to 400° C. The alloys suitable as the core of the coinage clads, represented in the figure by copper alloys C220 and C6155, do not decrease significantly in yield strength when heated to about 200° C., but exhibit a rapid decrease in strength when heated in the range of from about 200° C. to about 400° C. Preferably, the onset of the rapid decrease in strength associated with the dynamic softening response occurs at a temperature of from about 250° C. to about 350° C. The annealing profile of C220 is similar to that of the preferred cladding layers thereby minimizing corrugation.

Figure 5:
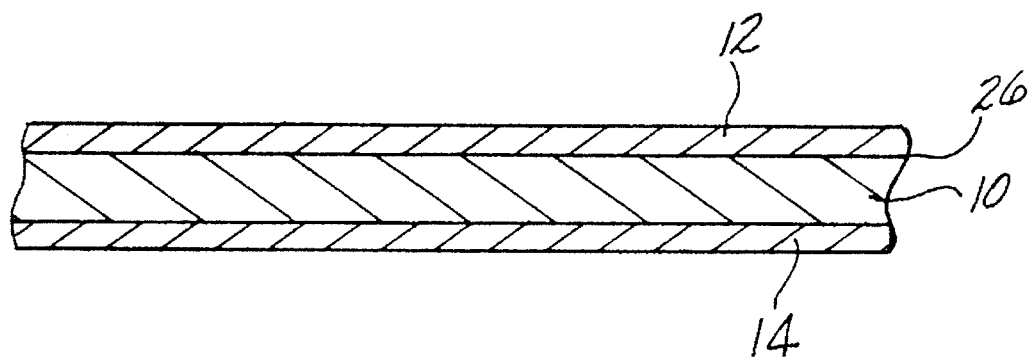
FIG. 5 illustrates in cross-sectional representation an acceptable clad in accordance with the invention.
Figure 6:
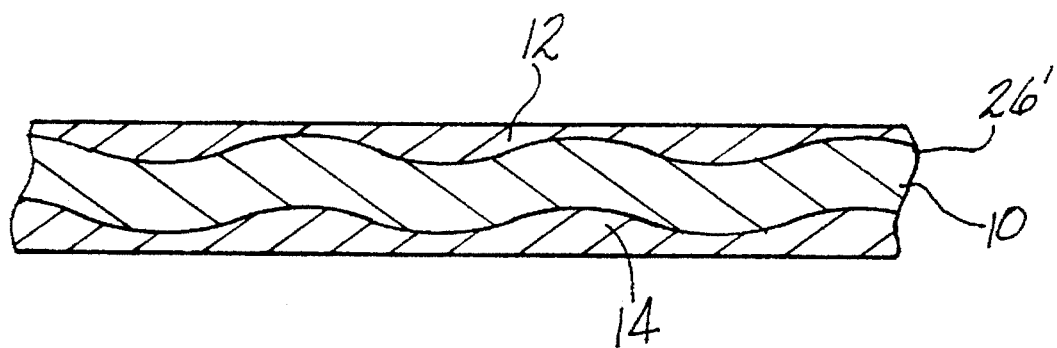
FIG. 6 illustrates in cross-sectional representation an unacceptable corrugated clad.

The impact of the strengthening response of the core is illustrated by comparing FIG. 5 and FIG. 6. FIG. 5 illustrates a composite where the core has a strengthening response similar to that of the cladding layers in accordance with the invention, the interface 26 between the core 10 and either the first cladding layer 12 or second cladding layer 14 is substantially flat. There is minimal variation in the thickness of the cladding layers.

FIG. 6 illustrates the periodic thickness variation of the interface 26' that results when the core 10 has a strengthening response dissimilar to that of the cladding layers. The thickness of the first and second cladding layers varies widely. The variation in cladding thickness can exceed 20%, necessitating any automated coin discrimination system to have a wide acceptance window and be prone to misidentification of counterfeit coins.

The advantages of the metallic composite of the invention will become more apparent from the examples that follow.

EXAMPLES

The compositions of the alloys metallurgically bonded together to form composites are illustrated in Table 1. Alloys A, B and C were utilized as core materials while alloys D, E and F were utilized as cladding layers.

TABLE 1

| Alloy | Composition | Common Designation |
|---|---|---|
| A | 99.90% Copper, minimum 0.05% oxygen maximum | C110 |
| B | 90% copper, 10% zinc | C220 |
| C | 70% Cu, 30% Zn | C260 |
| D | 92% Cu, 6% Al, 2% Ni | C6155 |
| E | 89% Cu, 5% Al, 5% Zn, 1% Sn | SWEDISH CROWN |
| F | 70% Cu, 24.5% Zn, 5.5% Ni | UK POUND |

Each combination was rolled in a single pass to a bonding reduction varying from 63% to 75%. The thickness of the core was twice the thickness of either the first cladding layer or the second cladding layer and both the first and second cladding layer were approximately the same thickness. Typically, the core before cladding had a thickness of 0.0875 inch and the first and second cladding layers each had a thickness of 0.0438 inch. After cladding, the metallic composite was microsectioned and the thickness of the clad layer measured along a longitudinal orientation (containing the rolling direction). The variation in cladding layer thickness is preferably minimized and should be less than about 7% for accurate discrimination by electronic means. Preferably, the variation in cladding layer thickness is less than about 3%.

As illustrated by Table 2, only the cores of the present invention provide the reduced corrugation necessary for electronic discrimination when the bonding reduction is in excess of 65%. The extremely low variation in clad thickness achieved with copper alloy C220 as a core, makes this a most favorable metal when combined with its high (40% IACS) electrical conductivity.

TABLE 2

| Variation in Clad Thickness for Gold-Colored Composites in the As-Bonded Condition | | |
|---|---|---|
| CLAD/CORE/CLAD | BONDING RDN (%) | CLAD VARIATION (%) |
| D/A/D | 63 | 1.9 |
|  | 65 | 8.1 |
|  | 68 | 13.5 |
|  | 69 | 17.8 |
| D/B/D | 68 | 2.7 |
|  | 73 | 5.2 |
| D/C/D | 68 | 2.7 |
| E/A/E | 75 | 13.9 |
| E/C/E | 68 | 1.7 |
| F/B/F | 70 | 0.5 |

It is apparent that there has been provided in accordance with this invention a metallic composite suitable for coinage that fully satisfies the objects, features and advantages set forth hereinabove. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A metallic composite useful as a coinage material, comprising:

a core formed from a copper base alloy that contains in excess of 50% by weight copper, but less than 99.0% by weight copper and has a room temperature electrical conductivity in excess of 25% IACS, an initial, before cladding, yield strength in excess of 10,000 psi and has a dynamic softening response onset at a temperature of from about 200° C. and about 400° C.; and cladding layers metallurgically bonded to both sides of said core, said cladding layers having both an initial yield strength greater than that of said core and a gold color.

2. The metallic composite of claim 1 wherein the room temperature electrical conductivity of said core is in excess of 35% IACS.

3. The metallic composite of claim 2 wherein said dynamic softening onset is at a temperature between about 250° C. and 350° C.

4. The metallic composite of claim 3 wherein said core consists essentially of from about 68.5% to about 99%, by weight, copper and the balance zinc.

5. The metallic composite of claim 3 wherein said core consists essentially of from about 68.5% to about 71.5%, by weight, copper and the balance zinc.

6. The metallic composite of claim 3 wherein said cladding layers are copper base alloys containing from about 3% to about 10%, by weight, aluminum.

7. The metallic composite of claim 6 wherein said cladding layers further contain, by weight, from about 2% to about 20% zinc and from about 0.5% to about 5% tin.

8. The metallic composite of claim 6 wherein said cladding layers further contain, by weight, from about 1% to about 5% nickel.

9. The metallic composite of claim 3 wherein said cladding layers consist essentially of, by weight, from about 20% to about 30% zinc, from about 2% to about 10% nickel and the balance copper.

10. The metallic composite of claim 1 wherein said core consists essentially of, by weight, from about 0.75% to about 5% tin, up to about 0.4% phosphorous and the balance copper.

11. The metallic composite of claim 10 wherein said cladding layers are copper base alloys containing from about 3% to about 10%, by weight, aluminum.

12. The metallic composite of claim 11 wherein said cladding layers further contain, by weight, from about 2% to about 20% zinc and from about 0.5% to about 5% tin.

13. The metallic composite of claim 11 wherein said cladding layers further contain, by weight, from about 1% to about 5% nickel.

14. The metallic composite of claim 10 wherein said cladding layers consist essentially of, by weight, from about 20% to about 30% zinc, from about 2% to about 10% nickel and the balance copper.

15. A planchet comprising:

a core consisting essentially of, by weight, from about 68.5% to about 99.0% copper and the balance zinc; and first and second cladding layers metallurgically bonded to opposing sides of said core, said first and second cladding layers having an initial yield strength more than the yield strength of said core, a gold color and a variation in thickness of each cladding layer being less than about 7%.

16. The planchet of claim 15 wherein the thickness ratio of first cladding layer/core/second cladding layer is from about 10/80/10 to about 30/40/30.

17. The planchet of claim 16 wherein the thickness ratio of first cladding layer/core/second cladding layer is from about 15/70/15 to about 27/46/27.

18. The planchet of claim 17 wherein said first and second cladding layers are copper base alloys containing from about 3% to about 10%, by weight, aluminum.

19. The planchet of claim 18 wherein said first and second cladding layers further contain, by weight, from about 2% to about 20% zinc and from about 0.5% to about 5% tin.

20. The planchet of claim 18 wherein said cladding layers further contain, by weight, from about 1% to about 5% nickel.

21. The planchet of claim 17 wherein said cladding layers consist essentially of, by weight, from about 20% to about 30% zinc, from about 2% to about 10% nickel and the balance copper.

22. The planchet of claim 17 wherein said core consists essentially of, by weight, from about 3.5% to about 11% tin, from about 0.03% to about 0.35% phosphorous and the balance copper.

* * * * *